July 6, 1943.  P. L. SNOWBERGER  2,323,575
SWIVEL JOINT ASSEMBLY
Filed Oct. 28, 1941
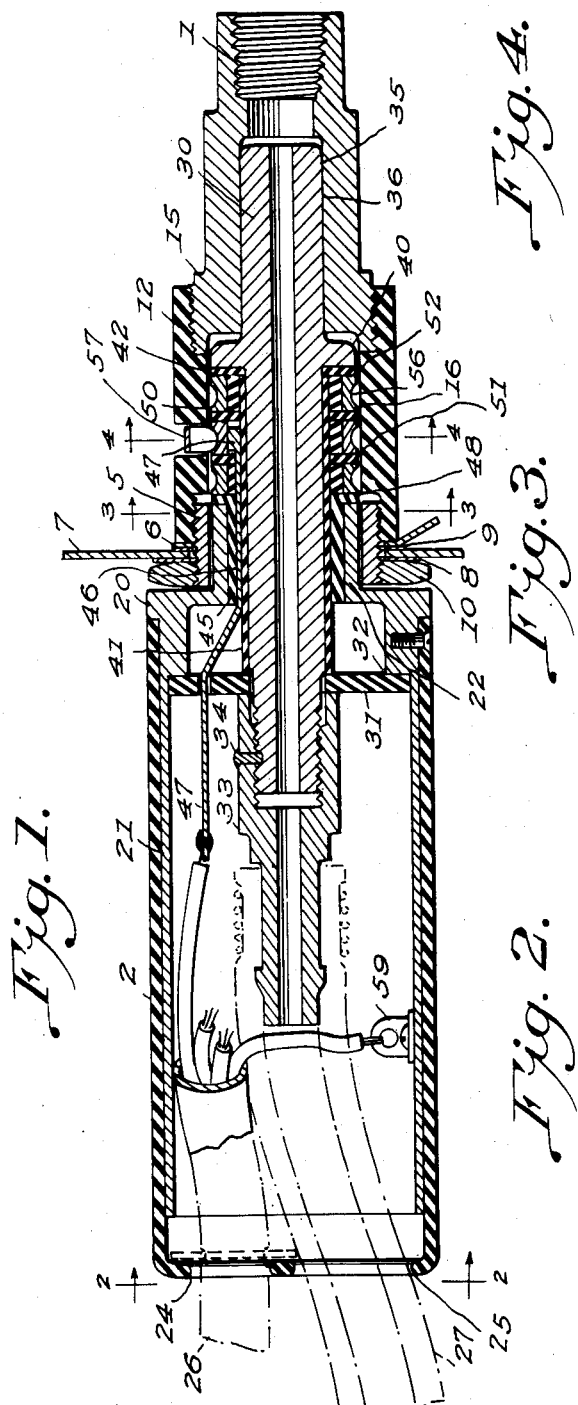
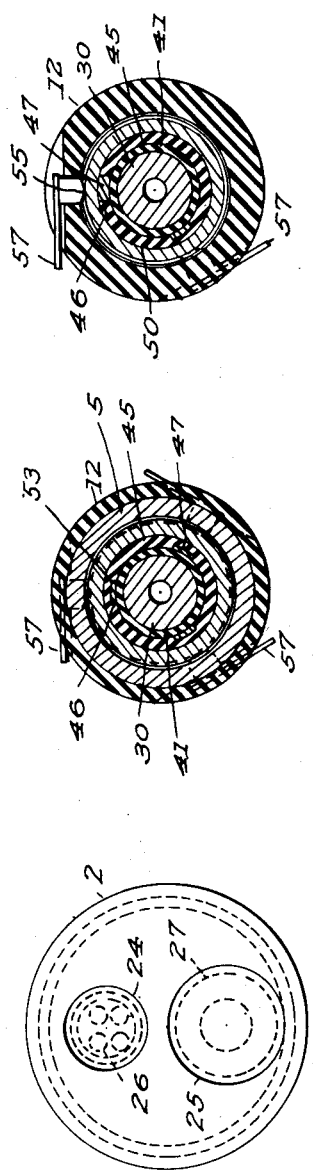
Inventor
PAUL L. SNOWBERGER
By George Douglas Jones
Attorney Patented July 6, 1943

2,323,575

UNITED STATES PATENT OFFICE 2,323,575

SWIVEL JOINT ASSEMBLY

Paul L. Snowberger, Baltimore, Md., assignor to
The Glenn L. Martin Company, Baltimore, Md.

Application October 28, 1941, Serial No. 416,794

2 Claims. (Cl. 174—21)

This invention relates to a swivel joint assembly and more particularly to a combined electrical conductor and fluid supply line device whereby relative rotation is obtainable between the two major portions of the device when one of said sections is fixed, and whereby the rotatable section thereof is quickly detachable from the fixed section.

The present invention has many broad applications of use where it is essential or desirable to connect electrical conductors and fluid supply lines between a rotatable member and a fixed member and be assured of continuous conductivity and flow. The further feature of being able to disconnect the combined electric and fluid circuits at will is accomplished in this device with a minimum of effort by a simple, longitudinal, sliding movement of the movable unit with the assurance that the circuits may be readily and properly re-established when the detachable portion is slipped into the stationary portion.

An example of one particular application of the invention is its use in rotating gun turrets of military aircraft, tanks and combat cars where the gunner is mounted in a rotatable or movable turret some distance away from the pilot or driver and it is necessary for the gunner to be in telephonic communication with the other members of the crew. In aircraft, it is also necessary that the gunner be supplied with oxygen during high altitude flights. Customarily, the oxygen mask and head phones form a permanent part of the gunner's helmet and are furnished with a free hanging gas tube and phone cord which the gunner must connect with the corresponding outlets in the plane when he takes his place in the gun compartment. However, in planes having rotating gun turrets, this arrangement is impractical as the movement of the turret kinks and twists the gas tube and phone cord and leads to serious difficulties.

It will be appreciated that due to the relative movement of the gun turret and the airplane itself, a swivel or rotatable connection between the fixed and movable parts of the airplane for the telephonic wires and oxygen breathing supply must be found. Of equal importance is the feature of quick detachability of these lines so that the gunner's oxygen mask and telephone head set can be plugged in and out at will when he enters or leaves his gun turret.

All of these desirable characteristics are embodied in the instant construction as illustrated in the accompanying drawing and described in the following specification and claims.

In the drawing:

Fig. 1 is a longitudinal cross section of the device showing the component parts thereof in operable position.

Fig. 2 is an end view of the casing showing the telephone wires and oxygen supply pipe passing through the end wall thereof.

Figs. 3 and 4 are vertical cross sections taken on lines 3—3 and 4—4, respectively, of Fig. 1, looking in the direction of the arrows.

For convenience of description, the quick detachable swivel joint assembly may be considered as composed of two major sections 1 and 2, section 1 being fixed to a stationary part of the airplane and section 2 being relatively rotatable in and detachable from the fixed section. More specifically, the fixed portion 1 of the assembly may comprise an externally screw threaded thimble 5 positioned within an opening 6 in the floor or other stationary part of the gun turret 7 and held in position in the opening by means of insulating washers 8 and 9 and nut 10.

The fixed section 1 of the assembly is held in rigid position against the under side of part 7 by the cylindrical member or casing 12 composed of a suitable insulating material. The cylinder 12 is internally screw threaded adjacent its ends for engagement with the external threads on the thimble 5 at one end and for engagement with the external threads on the pipe coupling 15 at the opposite end thereof. It will be observed that both the thimble 5 and the coupling 15 abut the ends of internal medial flange portion 16 formed internally of the cylinder 12. Thus, when nut 10 is tightened, it binds the cylinder 12 carrying coupling 15 into fixed relation with plate 7 to fixedly secure the section 1 in position, and as will be developed hereinafter, this section forms a socket or receptacle for the multiple electric circuits and a fluid tight gas line.

The rotatable and detachable section 2 of the assembly may comprise an open ended metal casing 20 having an insulated sleeve 21 thereover and an end portion 22 of reduced diameter; the insulating sleeve 21 overlying the casing 20 terminates in an end cover 23 having openings 24 and 25 therein for the passage of phone cable 26 and flexible oxygen hose 27 therethrough.

Lying centrally of and extending through the opposite reduced diameter end section 22 of casing 20 is the oxygen supply pipe 30 which is secured in position therewith by apertured insulating partition 31 lying against internal shoulder 32. The end of pipe 30 is screw threaded into hose coupling 33 whose inner end is drawn up tight against the partition 31 and secured against rotation by set screw or rivet 34.

The end portion 35 of the pipe 30 is ground or lapped to create a leakproof, rotatable socket joint with the abutting interior surface 36 of the coupling 15 which is similarly lapped. Such a fluid tight joint or seal does not ordinarily have to be lubricated or packed, although it is within the purview of this invention to utilize gaskets, sealing rings or the like between these rotatable and detachable surfaces if desirable.

An integral, radial shoulder 40 is formed on the pipe 30, beyond the lapped end portion thereof to position thereon a concentric insulating sleeve 41 having an end flange 42. The opposite end of the insulating sleeve 41 abuts the partition 31 through which the threaded end of the pipe 30 extends.

A second concentric insulating sleeve 45 is fitted over the sleeve 41 carried on pipe 30 for the length of the reduced end portion of the casing 20. This somewhat thick walled, insulated sleeve 45 is provided with a series of longitudinal, equispaced, internal grooves 46 within which are carried phone bus bars 47, see Fig. 3.

As shown, there are three such electrical connectors or bars, although as many as necessary may be utilized. The second or outer insulating sleeve 45 terminates in a radial end flange 48 which lies over and insulates the outer end of the reduced portion of the casing 20. In the space lying between the outer face of the flange 48 and the inner face of the flange 42 carried on the insulating sleeve 41 there are positioned a plurality of spaced commutator or electrical collector rings 50. Each collector ring 50 is insulated from its adjoining ring by insulating separator rings 51 and cylindrical insulating rings 52. The phone bars 47 extending through grooves 46 are joined to their respective collector rings 50 by metal lugs 53 extending through openings in the insulating sleeve 45. The insulation ring 51 separates the first ring 50 from the other bars 47 of the succeeding rings while permitting them to pass along to the point where they are joined to their respective collector rings. Thus, each bar and ring is fully insulated from the other.

External, detachable, electrical connection with the rings 50 is established by the silver shoes 55 curved to fully contact the complementary curved grooves 56 formed in the exterior faces of the collector rings. The contact shoes are welded or brazed to radially extending, bronze strips 57 and these shoe and strip assemblies are mounted and carried in transverse slots 58 cut in the periphery of the thick central portion of insulating cylinder 12.

As shown, the phone connections are soldered to the ends of bars or clips 47 and to the strips 57 with one of the wires of cable 26, grounded to a clip 59 within the metal casing 20, although the precise number and arrangement of these parts will depend on the phone system employed.

It will be obvious to those skilled in the art that relative rotational movement may readily take place between major portions 1 and 2 of the device while maintaining complete electrical contact through the several circuits and a fluid tight connection through the central oxygen line. Furthermore, due to the arrangement of parts and the curved formation of the shoes 55 contacting the curved grooves 56 and the grounded fit of the pipe joint surfaces 35 and 36, the entire major portion 2 may be easily slipped into or out of engagement with portion 1. Thus, there has been created a novel device which permits a fluid line and a plurality of electrical circuits to readily be detachable from a fixed plug or socket while allowing swivelable movement between the detachable and fixed portions thereof.

What I claim is:

1. A combined separable fluid joint and electrical connector comprising a fixed socket portion and a readily detachable, rotatable plug portion, axially alignable fluid conduits extending through both of said portions, a plurality of electrical contacts carried on the exterior of said plug, and a plurality of complementary contacts carried on the interior of said socket, said contacts carried on the said plug comprising a plurality of conductor rings mounted on but insulated from the fluid conduit of the said detachable, rotatable plug portion, and the complementary contacts carried on the interior of said fixed socket portion comprise spring fingers extending through radial openings in the said socket to bear against the said conductor rings when the said plug is positioned in the said socket.

2. A combined separable fluid joint and electrical connector comprising a fixed socket portion and a readily detachable, rotatable plug portion, axially alignable fluid conduits extending through both of said portions, a plurality of electrical contacts carried on the exterior of said plug, and a plurality of complementary contacts carried on the interior of said socket, said fixed socket portion consisting of a cylindrical sleeve of insulating material having a pipe nozzle secured in the outer end thereof and one or more electrical contact arms extending into the interior of the socket through the said insulating sleeve; the said detachable, rotatable plug portion consisting of a fluid conduit having an end portion adapted to be inserted into the said pipe nozzle, an insulating sleeve encompassing the mid-section of the said fluid conduit and one or more commutator rings mounted around the insulating sleeve on the said mid-section of the conduit whereby the said interior electrical contact arms in the wall of the socket contact the commutator rings on the insulating sleeve when the end of the fluid conduit is inserted in the said pipe nozzle.

PAUL L. SNOWBERGER.